United States Patent [19]

Schnitzler

[11] 4,111,592
[45] Sep. 5, 1978

[54] MULTI-ZONE DRILLING SYSTEM WITH SPIRAL DRILLS AND QUICK ADJUSTMENT FOR FLAT AND DEEP DRILLINGS AT A MINIMUM JUTTING-OUT LENGTH OF THE DRILL ATTACHMENT

[76] Inventor: Hanns Schnitzler, Eichenweg 5, Hattingen, Ruhr, Fed. Rep. of Germany, 4320

[21] Appl. No.: 782,408

[22] Filed: Mar. 29, 1977

[30] Foreign Application Priority Data

Apr. 3, 1976 [DE] Fed. Rep. of Germany ....... 2614532

[51] Int. Cl.² .................. B23B 31/44; B23B 5/22
[52] U.S. Cl. .................................... 408/197; 279/22; 279/75; 408/226; 408/240
[58] Field of Search ............... 408/197, 226, 238, 239, 408/240; 279/22, 46, 50, 75

[56] References Cited

U.S. PATENT DOCUMENTS

| 2,751,229 | 6/1956 | Schultz | 279/22 X |
| 3,816,015 | 6/1974 | Bliz et al. | 279/75 X |

Primary Examiner—Travis S. McGehee
Attorney, Agent, or Firm—Otto John Munz

[57] ABSTRACT

The multi-zone drilling system consists of a spiral drill provided, over its whole length, with continuous spiral slots and a uniform core diameter, which drill is driven by steel clamps mounted in the bottom portion of the drill chuck and engaging the spiral slot surfaces. The spiral drill is furthermore provided, at its upper end, with an annular slot pin, extractably fixed in an annular slot-locking sleeve; this annular slot-locking sleeve is in turn mounted in a pressure element which is vertically adjustable in a delicately stepped way via a connecting bush, for the purpose of altering the jutting-out length of the drill attachment in the drill chuck.

9 Claims, 5 Drawing Figures

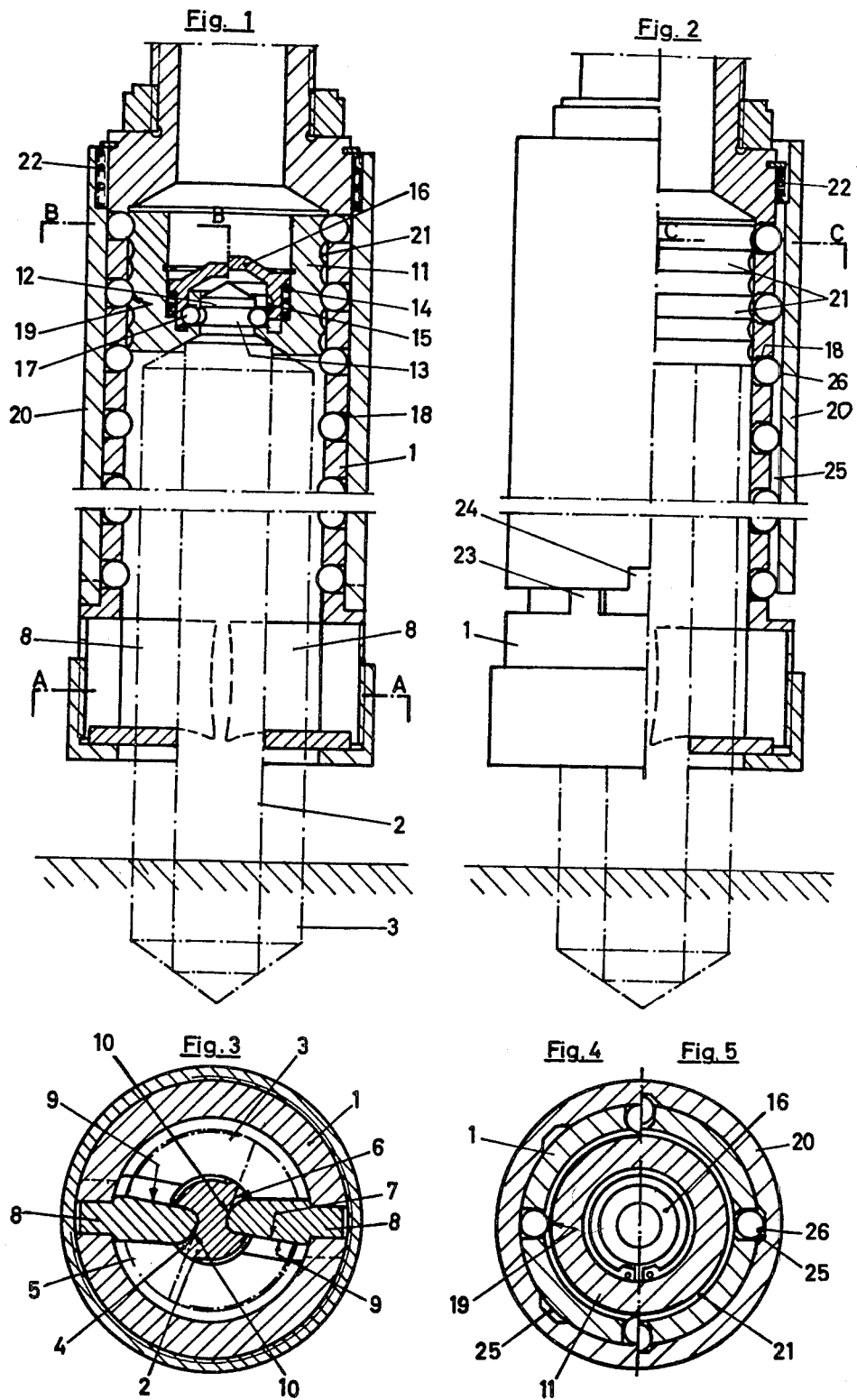

MULTI-ZONE DRILLING SYSTEM WITH SPIRAL DRILLS AND QUICK ADJUSTMENT FOR FLAT AND DEEP DRILLINGS AT A MINIMUM JUTTING-OUT LENGTH OF THE DRILL ATTACHMENT

CROSS-REFERENCE TO A RELATED APPLICATION

Priority of German application No. P 26 14 532.4 filed Apr. 3, 1976 is claimed under the Convention.

FIELD OF ART

A multi-zone drilling system with spiral drills and quick adjustment, for flat and deep drillings at a minimum jutting out length of the drill attachment comprises the drill torsion, the return support of the spiral drill, and the adjustment of the jutting-out length of the drill attachment.

PRIOR ART

It is known to bring about the torsion of spiral drills provided with a continuous spiral slot and a core diameter that is uniform over the whole spiral length, by means of clamps mounted in the bottom end of the chuck element (drill insert element), the carrying sections of these clamps engaging the spiral slots of the spiral drill in such a way that the surfaces of the two elements abut tightly against each other. Since this arrangement permits very short jutting-out lengths of the drill attachment, the torsion vibrations and thus also the destructive forces in the operating drill are very strongly diminished; this in turn results in very high thrust capacities and in long service lives in drilling operations.

Since spiral drills can be wound through their carrier devices, the danger exists that at the extraction of the spiral drill from the drill hole, the drill, as a result of its own weight and especially of the burr formed almost always at the drill hole outlet when the drill is being pushed through, may wind itself through the carrier device and in this process may drop out of the drill chuck.

To avoid this, spiral drills are equipped at their front end in a known manner with a locking device wherein an annular slot pin engages, in an easily and quickly releasable way, a ball race inside a pressure element fixed in the drill chuck. The pressure element which transmits the drill pressure to the spiral drill, is shaped in a known manner as pressing screw and is vertically adjustable by up and down screwing, in the drill chuck which is provided with an internal thread, which operation has the purpose of altering the jutting-out length of the drill attachment.

The conventional drilling systems with the most important characteristics of a short and variable jutting-out length of the drill attachment and with a torsion-carrying operation of the spiral drill in the area of its jutting-out length of the drill attachment, require, for altering the jutting-out length of the drill attachment an up and down screwing of the pressure element in the drill chuck that is relatively time consuming and limited with respect to the jutting-out length. At small drilling depth — up to about 50 mm — it is offhand possible to get along without the most favorable adjustment of the jutting-out length of the drill attachment by means of pressure screw setting, spiral drill exchange or even drill chuck replacement, and the incurred machine stoppage. However, with frequent or even continual change of drill hole depths and drill hole diameters, the stoppage periods (production stoppages) thus incurred and the then necessary greater need for bits play a very important part.

SUMMARY OF THE INVENTION

The objects of the invention are:
to improve the processes of supporting, displacing, and exchanging spiral drills driven by clamps in multi-zone drill chucks with short jutting-out lengths of the drill attachment, and
to provide means to:
extract from the drill chuck the spiral drill secured in the drill chuck against dropping out,
replace it for deep drilling by a longer spiral drill;
adjust with the same speed the jutting-out length of the drill attachment within the drill chuck to the drill hole depth required; and
to provide a high-efficiency drilling system comprising a combustion of the following characteristics:

(a) spiral drills of one and the same multi-zone drill chuck have each two groove surfaces extending outward in a straight line at an angle of at least 90°; against these groove surfaces abut carrier devices of the same surfaces, in the direction of rotation of the spiral drill in a tight manner and in the opposite direction with a slight play.

(b) Spiral drills which can be employed in one and the same multi-zone drill chuck are provided at their upper ends with annular-slot pins of variable size, in connection with an annular-slot locking sleeve mounted in the pressure element of the drill chuck, so as to be axially displaceable against a spring; the locking sleeve locks in its locking position the coupling locking elements in the annular slot of the annular slot pin, and in its free position carries the coupling locking elements back into their own annular slots.

(c) The delicately stepped adjustment of the jutting-out length of the drill attachment is carried out by means of locking balls, mounted in the chuck casing so as to be radially displaceable in holes. The locking balls with their caps are held, in the drilling position, by a connecting bush pivotably mounted on the chuck casing toward the inside in comb-shaped grooves of the spiral drill pressure element adjustable in the chuck casing. The locking balls, after a pivoting of the connecting bush in displacement position recede toward the outside in longitudinal grooves of the connecting bush and thereby release the spiral drill pressure element.

(d) The chuck casing and the connecting bush are connected in the drilling position by a cam coupling and are releasable in the displacement position by lifting and pivoting the connecting bush against a spring.

BRIEF DESCRIPTION OF THE DRAWINGS

In the drawing showing a preferred embodiment of the invention

FIG. 1 is a longitudinal section through a drill chuck pressure element with a locking device for the spiral drills, spiral drill drive, and connecting bush, in the drilling position — the right half of the locking device being shown in the locking position, and the left half in the releasing position;

FIG. 2 illustrates a drill chuck with connecting bush — the left half being in elevation, and the right half with drill chuck out in displacement position;

FIG. 3 is a section along line A—A of FIG. 1;
FIG. 4 is a section along line B—B of FIG. 1;
FIG. 5 is a section along line C—C of FIG. 2.

DESCRIPTION OF THE PREFERRED EMBODIMENTS

The drilling system comprises a drill chuck 1 for spiral drills, 2, 3 of one diameter area, the grooves 4, 5 of the spiral drills 2, 3 in each case having two groove surfaces 6, 7 which extend in a straight line outward at an angle of about 90°. Carrier devices 8 of the same surface areas are mounted exchangeably in the drill chuck 1 and abut against the said groove surfaces 6, 7 — tightly with their sides 9, and with a slight play with their sides 10. The spiral drills are releasably connected by means of a locking device, with a pressure element 11 which is axially displaceable and lockable in the drill chuck. The locking device comprises a pin 12 with an annular slot 13 mounted at the upper end of the spiral drills 2, 3 and remains constant for spiral drills of one diameter zone. The pin 12 is arranged in a locking sleeve 16 which is displaceable against a locking sleeve spring 14 and is equipped with an internal annular pin-slot 15. The locking device is formed by several balls 17 distributed over the periphery of the pin. In locking position the balls are pressed by the locking sleeve 16 into the annular slot 13 of the pin and connect thereby the pin 12, the locking sleeve 16, and balls 17 and the pressure element 11 so that their axis remains fixed. After the locking sleeve 16 is compressed against spring 14, and the spiral drill is extracted from the drill chuck 1, or the spiral drill is rotated out by the carrier devices 8, the balls 17 move into the internal annular slot 15 of the locking sleeve 16 and thus release pin 12. The delicately stepped adjustment of the pressure element 11 functions in a similar manner and thereby the alteration of the jutting-out length of the drill attachment in the chuck casing is carried out.

The quick speed-shifting device for changing the jutting-out length of the drill attachment comprises locking balls mounted radially movably in holes 18 of the casing. The locking balls are pushed in the drilling position with their caps 19 by a connecting bush 20. The bush is mounted movably on the chuck casing 1 inwardly into comb-like grooves 21 of the pressure element 11 and thereby fixes the latter with respect to its level in the drill chuck 1. By sliding the connecting bush 20 upward against a cam coupling spring 22, a coupling cam 23 in the drill chuck 1 and an opening 24 in the connecting bush 20 are disengaged, so that the connecting bush can be adjusted, by pivoting, in such way that its longitudinal grooves 25 coincide with the axis of the locking balls. When the spiral drill 2, 3, and thus the pressure element 11 are axially displaced in the drill chuck 1 by rotation outward or inward between the carrier devices 8, the locking balls with their caps 26 evade into the longitudinal grooves 25 of the connecting bush 20. After the required jutting-out length of the drill attachment is set, the connecting bush 20 is pivoted back and coupled with the drill chuck 1, whereby the corresponding locking balls with their caps 19 are pressed back again into the comb-like grooves 21 of the pressure element 11, and the latter is again firmly connected with the drill chuck at the set level.

In the claims the terms "top", "upper", "lower", "horizontal", etc. are for clarity in pointing out the invention as it appears upon FIGS. 1 and 2, and are not to be interpreted as limiting the use of the device to any particular angular position with respect to the vertical.

What is claimed is:

1. In an attachment for twist drills, to adjustably limit the drilling depth thereof, a tubular chuck casing having a longitudinal axis of symmetry, to receive a twist drill therein for extension therealong, a tubular bushing smoothly fitting over and about said casing for limited rotation relatively thereto, about said axis, between first and second positions, a cylindrical pressure element smoothly fitting within said casing for adjustment relatively thereto along said axis, first clutch means carried by said element and operable to connect and disconnect said element to and from the top end of a drill in said casing, second clutch means operable to connect and disconnect said casing and said element, by and in response to rotation of said casing with respect to said bushing, between said first and second positions, respectively, and first means carried by and at the lower end of said casing, to engage and rotate a twist drill in said casing and as a unit therewith, for all positions of longitudinal adjustment of a drill in and with respect to said casing, the lower end of said casing forming a workpiece-contacting abutment.

2. The attachment of claim 1, said bushing also having limited sliding between first and second locations on and axially along said casing, and means operable to connect and disconnect said bushing and casing for rotation as a unit, by and in response to sliding of said bushing from first to second location.

3. The attachment of claim 1, in combination with a twist drill of uniform core diameter and fluted to define channels between flutes, of uniform transverse section, said first means comprising carrier devices fixed with and extending radially inwardly from the lower end of said casing, into respective ones of said channels.

4. The combination of claim 3, said drill comprising a first outer tubular part having an axial bore, and a second part smoothly fitting said bore, the lower ends of said parts conjointly forming cutting lips of the drill.

5. The combination of claim 3, said drill having a pin projecting axially from its top end, there being a first annular groove in said pin, said first clutch means comprising a locking sleeve axially and slidably fitting a bore in said pressure element and having a second annular groove internally thereof and movable from first to second positions to locate said first and second grooves respectively, into and out of horizontal registration, and a plurality of balls confined in, by and between said grooves and forced into said first groove by sliding of said sleeve from first to second position to thereby positively connect said drill and pressure element, and first spring means engaging said sleeve and urging the same into its said second position, said drill being movable axially out of said casing when said sleeve is moved to its said first position.

6. The attachment of claim 1, said second clutch means comprising a plurality of sets of holes in and through the walls of said casing, each set being in a respective one of a plurality of planes normal to and uniformly spaced along said axis, the holes of each set being equiangularly spaced about said axis, corresponding holes of each set being disposed in and determining a respective one of a plurality of rows parallel with and equiangularly spaced about said axis, there being a plurality of linear channels in the interior wall of said bushing and spaced about said axis in conformity with said rows of holes, there also being a plurality of annular grooves in and exteriorly of said pressure element, closely spaced along and normal to said axis, a plurality of balls, one confined in each respective hole for limited radial movement therein, rotation of said bushing to its said first position, moving each channel of said bushing out of registration with the balls of its row and forcing the balls of at least one set, into a groove of said pressure element, to thereby firmly connect said casing and pressure element, rotation of said bushing to its said second position registering each row of balls with a respective one of its channels in said bushing, to thereby release the balls from the grooves in said pressure element and thus disconnect said casing and bushing.

7. The attachment of claim 1, said bushing also having limited sliding adjustment on and relatively to said casing, in parallel with said axis, and a disconnectable coupling between said casing and said bushing and operated by and in response to axial sliding of said bushing between first and second locations, to respectively connect and disconnect said casing from said bushing when the latter is in its second rotational position only.

8. The attachment of claim 7, said coupling comprising a notch in the lower edge of said bushing and a tooth in the lower end of said casing, the tooth and notch interengaging only when said casing and bushing are in their said first rotational position, and spring means acting between the casing and bushing and urging the same axially into their said first axial sliding location.

9. The attachment of claim 6, the axial spacing of the annular grooves in said pressure element being an aliquot fraction of the spacing between the planes of contiguous sets of holes in said casing.

* * * * *